US012493686B1

(12) United States Patent
Richter et al.

(10) Patent No.: US 12,493,686 B1
(45) Date of Patent: Dec. 9, 2025

(54) SYSTEMS AND METHODS FOR QUERYING DATA

(71) Applicant: Mondoo, Inc., Cary, NC (US)

(72) Inventors: Christian Dominik Richter, Los Angeles, CA (US); Christoph Hartmann, Berlin (DE)

(73) Assignee: Mondoo, Inc., Cary, NC (US)

( * ) Notice: Subject to any disclaimer, the term of this patent is extended or adjusted under 35 U.S.C. 154(b) by 78 days.

(21) Appl. No.: 18/582,290

(22) Filed: Feb. 20, 2024

Related U.S. Application Data

(60) Provisional application No. 63/447,110, filed on Feb. 21, 2023.

(51) Int. Cl.
*G06F 21/54* (2013.01)
*G06F 16/242* (2019.01)
*G06F 16/2452* (2019.01)

(52) U.S. Cl.
CPC .......... *G06F 21/54* (2013.01); *G06F 16/2433* (2019.01); *G06F 16/24522* (2019.01); *G06F 2221/034* (2013.01)

(58) Field of Classification Search
CPC ................ G06F 21/54; G06F 16/2433; G06F 16/24522; G06F 2221/034
See application file for complete search history.

(56) References Cited

U.S. PATENT DOCUMENTS

| | | | | |
|---|---|---|---|---|
| 10,135,874 B1 * | 11/2018 | Perry | ...................... | G06F 21/54 |
| 2019/0034406 A1 * | 1/2019 | Singh | .................... | G06F 40/274 |
| 2021/0248114 A1 * | 8/2021 | Tamjidi | ............... | G06F 16/2433 |

OTHER PUBLICATIONS

Brito, Gleison, and Marco Tulio Valente. "REST vs GraphQL: A controlled experiment." 2020 IEEE international conference on software architecture (ICSA). IEEE. (Year: 2020).*
Batarfi—A distributed query execution engine of big attributed graphs. (Year: 2016).*
GraphQL. Facebook. https://github.com/graphql/graphql-spec/releases. Oct. 2021.*
Kocman, Mag Dr Andreas. Evaluation of the Applicability of GraphQL for Integration Layers in Heterogeneous Mi-croservice Architectures. Diss. University of Applied Sciences Technikum Wien. (Year: 2021).*
Mavroudeas, Georgios, et al. "Learning GraphQL query cost." 2021 36th IEEE/ACM International Conference on Automated Software Engineering (ASE). IEEE. (Year: 2021).*
Ni, Pin, et al. "Knowledge graph and deep learning-based text-to-GraphQL model for intelligent medical consultation chatbot." Information Systems Frontiers 26.1. Jul. 2022.*
Vodomin, Goran, and Darko Androcec. "Problems during database migration to the cloud." Central European Conference on Information and Intelligent Systems. Faculty of Organization and Informatics Varazdin. (Year: 2015).*

* cited by examiner

*Primary Examiner* — John M Macilwinen
(74) *Attorney, Agent, or Firm* — Wilson Sonsini Goodrich & Rosati

(57) ABSTRACT

Provided herein are systems and methods for querying data. The method comprises: (a) receiving a input query from a user to examine an object; (b) traversing a graph to identify one or more resources for collecting data based on the input query, the relational structure is a multi-layered stack; and (c) aggregating the data to construct a view for the object. The view comprises information about metadata of the object or a relationship between the object and the one or more resources.

20 Claims, 9 Drawing Sheets

```
Package {
    name
    version
    files.list {
        path
        size
    }
}
```
← 101

```
hi = "Hello "
message = hi +   Users[0].name
message += " there are " + (users.list.length-1) + " other users"
```
← 103

*FIG. 1*

```
sshd.config.params["Protocol"] >= 2         ← 201
user(name).isActive users.where(                                ← 203
    permission == "admin" &&
    lastLogin > 30 * time.days
).where(
    name == /bob/
).list {
    userID
    lastLogin
}
```

*FIG. 2*

SYSTEMS AND METHODS FOR QUERYING DATA

CROSS-REFERENCE TO RELATED APPLICATION

This application claims the benefit of U.S. Provisional Patent Application No. 63/447,110, filed Feb. 21, 2023, which is incorporated herein by reference in its entirety.

BACKGROUND

Software development and information technology operations (DevOps), as well as security and information technology operations (SecOps) face challenges such as lacking a uniform platform for managing vulnerabilities and policy compliance, inquiring a system's or fleet's configuration and state, and tracking changes in the infrastructure. These problems are often solved in isolation, using a combination of separate tools (vulnerability scanner, policy scanner, CMDBs, data-stores, etc), scripts, and manual work.

Furthermore, transition of traditional physical infrastructure to a service-oriented architecture has allowed application developers to focus more on the development of their applications rather than maintaining their own physical infrastructure. Currently, individual microservices may be independently built, tested, and deployed to facilitate continuous integration (CI) and continuous delivery (CD) DevOps paradigm(s). Different teams (e.g., security, engineering, operations) may use different mechanisms or sources to access the state, configuration, or changes in infrastructure which can result in different versions of reality. It is desirable to provide a unified platform for application developers and/or cloud services providers to access their deployed applications, infrastructures, configurations, states and associated data, new solutions and mechanisms with improved transparency and efficiency.

SUMMARY

Recognized herein is a need for methods and systems capable of providing infrastructure and security analytics (such as for cloud-native applications) with improved access to infrastructure operations and its states. The present disclosure may address the above needs by providing systems employing a new distributed data query language that can discover and organize queried data, and report consistent information to DevOps/SecOps teams. For example, the distributed data query language may allow users to establish connections within the system infrastructure and expand on these connections to navigate within the infrastructure. In particular, systems and methods of the present disclosure provide a Distributed Data Query Language (DDQL) that combines data queries with scripting, which allows for empowering functionalities and a unified platform for DevOps, SecOps or DevSecOps.

In some embodiments, the provided DDQL and systems may allow for multi-perspective views of the infrastructure, assets, resources or packages based on user queries that may improve the query process for extracting infrastructure information. The provided DDQL may also provide a continuous query process for monitoring changes in infrastructure. DDQL of the present disclosure may be utilized by a platform, system, and/or application for vulnerability management, policy and compliance management, CI/CD DevOps pipelines and various other applications. The DDQL can also be integrated into cloud environments for users to have access to up-to-date information.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 1 shows examples of building blocks of the Distributed Data Query Language (DDQL), in accordance with embodiments of the invention;

FIG. 2 shows other examples of building blocks of the DDQL, in accordance with the embodiments of the invention;

DETAILED DESCRIPTION

Figure 3:
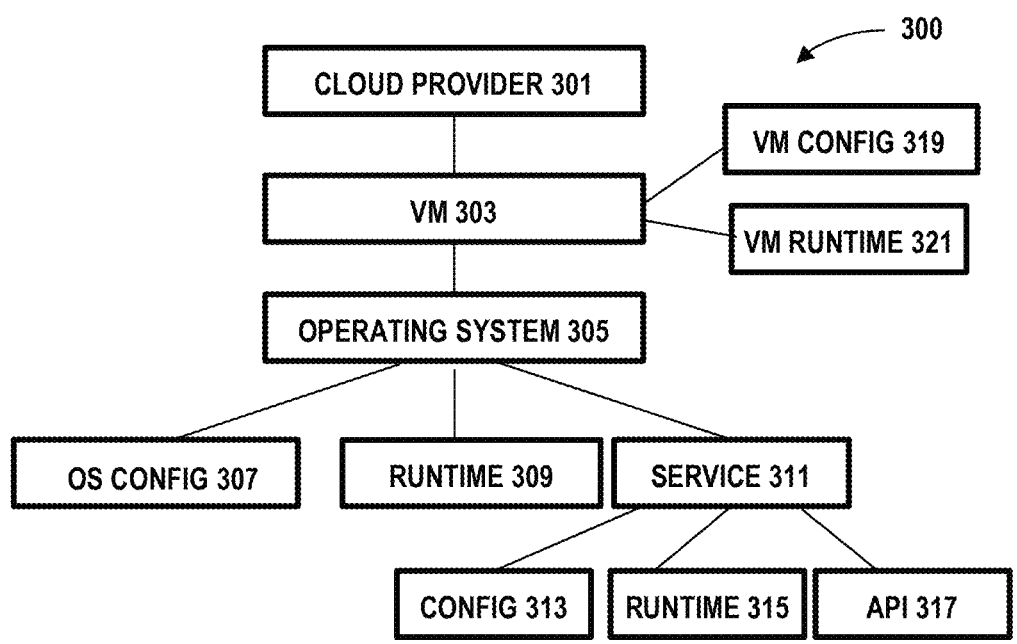
FIG. 3 illustrates an example of a multi-dimensional relational graph, in accordance with the embodiments of the invention.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Certain Definitions

Unless otherwise defined, all technical terms used herein have the same meaning as commonly understood by one of ordinary skill in the art to which this invention belongs.

Reference throughout this specification to "some embodiments," or "an embodiment," means that a particular feature, structure, or characteristic described in connection with the embodiment is included in at least one embodiment. Thus, the appearances of the phrase "in some embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," "unit" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In some cases, a component can emulate an electronic component via a virtual machine, e.g., within a cloud computing system.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

While existing solutions may enable the application developers to accomplish some of these functionalities (e.g., deployment of their applications, testing of their applications, etc.), due to lacking of a consistent and unified data query mechanism, many of these functionalities are fragmented in various different solutions resulting in insufficient consistency. Currently, there is a lack of a unified system/platform that allows software developers to monitor in real-time and quickly access information regarding the infrastructure resources, performance of their deployed applications or rapidly build, test, and deploy their application on a continuous basis to their desired infrastructure services providers. Additionally, current infrastructure and security analytics for cloud-native applications may lack transparency and can be cumbersome for users to access infrastructure operations, its configurations, states and associated data.

Distributed Data Query Language (DDQL)

In one aspect of the present disclosure, a distributed data query language (DDQL) is provided for a unified platform for distribution of queries (and their execution and result collection). This beneficially allows users to query data with improved performance and user experience. For example, the DDQL may be utilized to query information regarding infrastructure, its resources, states of the resources, configurations, associated data, discovering relationships and various others.

The distributed data query language (DDQL) may break down a query (e.g., user input query) that related to multiple resources (e.g., services) into parts (e.g., sub-queries) or executable query codes that need to go to each of those resources. The DDQL creates and maintains interrelationships between the resources via a relational graph. The DDQL may execute the executable query codes (e.g., by distributed agents) over those identified resources (e.g., backends, services), then collect the data and combine into one result for the query. Details about converting a query into multiple parts or executable query codes are described later herein.

The term "infrastructure" generally refers to a framework of a system that may be composed of physical and virtual resources. In some examples, this framework may support the flow, storage, processing, and analysis of data. In another example, an infrastructure may include, for example, software, source code, binaries, and services. The term "configurations" generally refers to the arrangement of hardware and/or software components that make up a computer system. In some embodiments, configuration may include integration, testing, infrastructure creation, or deployment workflows. The term "state" generally refers to the remembered information of a system. In some cases, the state may comprise memory locations of stored data for a computer program.

The DDQL herein uniquely combines search queries with scripting thereby providing improved capabilities for both data extraction and data manipulation. The DDQL may also allow users to define assertions conveniently. The DDQL may be used to query data with powerful filtering along with data extraction. For example, users may query information about resource locations or contents, administrative access (e.g., user logins), or connectivity within a system's infrastructure. In some cases, the user query may be an unstructured query which is automatically converted to executable query code (e.g., DDQL queries) by the system.

The DDQL herein may combine the capabilities of data extraction, scripting, and assertion. Data extraction may generally involve retrieving data from a data source. In some cases, the query feature of the DDQL may adopt graph queries that specify nodes and/or edges of a graph, such as GraphQL queries, and expand the graph query with assertions and scripting. The query feature may allow users to easily extract data from a data source (e.g., package, asset, API, etc.). For example, the GraphQL-based query feature may easily allow queries to fetch data from multiple resources (i.e., nodes) by traversing a graph of the multiple resources. The scripting feature may comprise a programming language that executes a task or a set of tasks. The set of tasks may be performed sequentially or concurrently. The scripting feature may be combined with the graph query such that data extraction and data manipulation can be achieved within the same query. The assertion feature may allow users to define a statement that may be evaluated as true in an executable program. In some cases, the statement may involve establishing relations between objects in the program. The DDQL may combine the assertion feature with the graph query and traverse the graph to perform both data extraction and turn data into an assertion.

FIG. 1 and FIG. 2 show examples of building blocks of the distributed data query language (DDQL), in accordance with some embodiments of the invention. As described above, the DDQL may combine data query features and scripting features. In some cases, the data query feature may adopt a data query and manipulation language for fulfilling queries with existing data. For instance, the data query feature may adopt graph query such as GraphQL for queries with data (e.g., assert, resources, APIs, configuration and runtime, package, etc.). As shown in the example, the data query building block 101 may be used to retrieve information or fetch data related to a resource such as the name and version of a package, and the path and size of a file.

The GraphQL-based query feature 101 with the extended scripting feature 103 may easily allow queries to fetch data from one or more associated resources while manipulating the data by traversing a graph of the resources. This may provide unique advantages allowing users to fetch related data of a resource at different levels (e.g., data in a graph) with a single query request, which is not just the properties of one resource but also follow references between the resources. When the DDQL is used in combination with the multi-perspective resource analysis feature of the system, a user may be permitted to send a single query about a resource and returned results including information collected from all supported sources/transports. System of the present disclosure may generate a graph data model for the resources in an infrastructure and provide flexibilities to the users to make queries and autocomplete the DDQL queries based on the relationships between the resources and the latest available information. Details about the multi-perspective resource analysis feature are described later herein.

The scripting feature combined with the graph queries may provide flexibility to allow users to manipulate/mutate data or define filtering conditions within a single query. For instance, the scripting building blocks 103 may be used to assign a string to a variable, and the variable may be used in the assignment of a new variable. The assignment of a new variable may additionally involve adding new strings. These new strings may be explicitly defined or may be obtained from accessing a list of objects and retrieving an object from the list. The scripting feature can be in any suitable form of programming language, such as JavaScript. For example, the scripting feature may allow users to change or define data conforming to the logical of the GraphQL syntax or other data query formats, such as projection; filtering; aggregation; sorting; flattening; arithmetic, logical, and data conversion expressions; hierarchical navigation across items and data sets; and specialized query operations.

FIG. 2 shows an example of a building block 201 of the DDQL with assertion features. The DDQL may provide building blocks to define assertions 201, and building blocks for filtering and extracting data 203 with combined assertion features. The assertion feature may be combined with the graph queries allowing users to make an assertion statement ensuring a certain condition always exists in the collected data (e.g., data collected on the fly). For example, a search engine or system herein may check the assertion whenever modifications are done in the data. For instance, users may use the built-in assertion blocks 201 to verify a particular response using properties such as contains, equals, counts and regular expression matches, and view results, review errors or accomplish other functionality using a web-based interface and/or the command line. In some cases, the DDQL may allow users to define simplified assertions using the built-in assertion blocks such as by establishing parameters for the assertion of object values, comparing members of objects to variable types (e.g., integers, floats, strings, characters, or Booleans) using numeric expressions. The DDQL may allow a user to define assertions 201 by establishing an assertion for the state of an object. For example, assertions 201 may be whether a user is active. The system may display details about an assertion failure such as the variable(s) involved, the expected value(s), and the mismatched returned value(s), and the like.

The DDQL may provide building blocks for filtering and extracting data 203. The building blocks 203 for filtering and extracting data may allow defining filtering conditions and specify the data to be extracted using simplified scripting language. The filtering function and data extraction function may include using of mathematical operators, logics conforming, accessing JavaScript Object Properties conforming to the Javascript format. For example, the ".where( )" function may be used to filter data and the interested data object may be extracted (e.g., {userID lastLogin}.

The DDQL herein may be statically-typed. For instance, the type of variables may be declared at the compile time instead of runtime. This may beneficially provide better code completion, capability to perform type checking during the course of compilation, better tooling and refactoring since the tools can find out the variable types as the program is coded. This feature may also avoid performing additional checks during runtime to confirm that an object can perform some actions. Such statically-typed DDQL may perform type checking during the course of compilation rather than during runtime, which makes programs written in these languages run much faster. This also beneficially allows for errors to be caught early. For example, errors such as incorrect type usage or field calls may be caught at the time of compiling. In some cases, an error message may be displayed to users in real-time to prompt the user to correct the error. For example, error messages such as adding numbers (e.g., integers, floats, etc.) to strings and obtaining the incorrect result may be displayed to users prior to compilation, and the user may be prompted to correct the variable types errors. As described above, the DDQL herein may be used as a compiled language. This beneficially accelerates the execution, as input queries don't have to be parsed and compiled again.

The distributed data query language (DDQL) of the present disclosure can be utilized for resource discovery and relationship mapping. Current infrastructure and security analytics for cloud-native applications may lack transparency and can be cumbersome for users to access infrastructure operations, its configurations, states and associated data. For example, current methods/systems may pre-store all the raw data in a passive datastore and answer queries based on the pre-stored data, or require users to possess knowledge about the relationship among the resources or what information is available in order to query the interested data.

The DDQL may be utilized by a unified platform which allows users to query the infrastructure, its resources, the states and associated data of the resources, discover relationship between the resources, without requiring the users to know ahead of time the schema of the underlying data (e.g., connected data, relationships, configuration, etc.). The data about resources, assets, configuration, states, metadata, and other data of an infrastructure may be defined in a schema that describes how a given resource is put together. For example, schematic information is inserted into a graph to determine the shape of the data. This beneficially allows for the system to answer a user's query by dynamically scanning multiple associated sources for an asset without pre-storing the data.

In some embodiments, the provided query system and method may generate a graph storing the relationships among the resources/assets such that a user is not required to know ahead of time how the associated data (e.g., state, configuration, connected resources, etc.) are connected with an asset (e.g., schematic information, layers, levels, etc.) in order to query the interested data. An infrastructure may be a framework of a system that may be composed of physical and virtual resources. For example, the framework may support the flow, storage, processing, and analysis of data. The infrastructure configurations may be about arrangement of hardware and/or software components that make up a computer system. For example, configuration may include integration, testing, infrastructure creation, or deployment workflows. The state of an infrastructure may be about the remembered information of a system. For example, the state may comprise memory locations of stored data for a computer program. Although the query, data discovery and relationship mapping methods/systems are described in the context of software development infrastructure, the present methods and systems can be utilized to query, access, analyze, and manage any other data and for various other applications.

In some embodiments, the present disclosure provides methods and systems defining the shape or schema of the data in graphs such that the system may fetch relevant data from one or more resources in the graph in response to a single query. This beneficially avoids requiring users to know ahead of time what data are available or the relationships among the resources in order to access the resource's information. For instance, the DDQL may allow users to quickly and conveniently access information about resources at various levels including but not limited to, resources at cloud provider level, virtual machine and its runtime and configuration, operating systems, bare-metal hypervisors, container engine (e.g., Docker®, Rocket (rkt), Solaris Containers, etc.), container image, VMware cluster, application programming interface (API), and various other connected data that may not be known to the user prior to the query.

The provided system and method may also be capable of providing a multi-view of the resources utilizing the DDQL. For example, the system may allow users to search, examine, and make assertions to the resources that may require information from multiple transports. The present disclosure provides methods and systems utilizing the DDQL to allow users to query and manage data about the system's state, configuration, repositories, its code, and code dependencies (e.g. other packages), and to discover relationships among the objects. For instance, users may interact with these resources holistically, as if they contained all information from all layers at once (e.g., users do not need to know the hierarchies of the objects). In some cases, the DDQL may query information related to the connectivity of the infrastructure (e.g., which database a program may be running on) or changes within the infrastructure (e.g., whether the content of a file has changed).

The provided methods and systems can be utilized for various infrastructures, platforms, applications, environments such as Clouds, cloud-native applications, virtual machines (VMs), Containers, Kubernetes and bare-metal. The term "cloud-native applications" generally refers to applications designed to be developed and managed on the cloud. In some cases, the cloud-native application may be developed and managed across private, public, or hybrid clouds.

Multi-Dimensional Relational Graph

In some embodiments of the present disclosure, systems and methods may allow users to access data by creating graphs for existing infrastructure and mapping resource relationships. FIG. 3 shows an example of a graph 300 for a cluster of resources. The graph 300 may contain schematic information about the connections/relationships among the multiple resources (e.g., cloud provider 301, virtual machine (VM) 303, operating system 305, etc.). The resources in the figures are for illustration purpose only and not intended to be limiting. For example, the graph may represent various resources including repositories, its code, and code dependencies (e.g. other packages), applications, its source codes, package dependencies and various others.

The graph may comprise a plurality of nodes. A node may represent a resource (e.g., VM 303, operating system 305, etc.). In some cases, a node may represent resources in an environment (e.g., cloud environments) that a user may wish to access in an infrastructure that are not Operating Systems. For example, such resources may include metadata information about a resource such as configuration (e.g., OS config 307, config 313, VM config 319) about a connected resource, services (e.g., service 311) running on a connected resource, a resource's runtime (e.g., VM runtime 321, runtime 309, runtime 315), exposed API (e.g., API 317), or other objects that a user may wish to access in an infrastructure. For example, a service MySQL may be running on a VM. In this instance, both the service and the VM may be treated as a resource. The MySQL service may have one or more child resources connected to it in the graph such as its configuration, runtime and API. The plurality of nodes in a graph may represent the types of resources (e.g., cloud service provider, VM, operating system, services, runtime, configuration, API, etc.) rather than the actual data/raw data. For example, the MySQL configuration in the graph may be composed of settings in the MySQL configuration files, which may be treated as the resource's (e.g., VM) metadata (rather than a node). This beneficially provides a platform with flexibility to navigate resources in environments that may not be operating systems and up-to-date cloud environments. For individual instances, users may query information about resources and their metadata (e.g., configuration). In the illustrated example, users may be interested to understand which service an API belongs to, on which VM it is running, or on which cloud provider it is hosted.

A node in the graph may represent a resource at various levels/layers. For example, a node may represent a cloud provider 301 (at cloud provider level), a VM 303, the inner workings of the VM such as the operating system 305, the runtime 319 and configuration 321 of the VM. The configuration 309 may be the arrangement, deployment, or customization of resources of the VM 303. The runtime 321 may be the runtime environment (e.g., resources needed to support running a program). In some cases, the operating system 305 may also have its own configuration 307 and runtime 309 and services 311 running on the operating system. The services 311 may have its own configuration 313, runtime 315, and application programming interface (API) 317.

The links/edges between the nodes may present the relationships/connections between resources. In some embodiments, these relationships may be multi-leveled relationships thereby providing a multi-dimensional relational graph. In some cases, the links can be directional or non-directional. Directional links may be relationships in which the direction is part of the relationship's meaning (e.g., X is part of Y, where X and Y may be a resource or metadata). Non-directional links may be relationships in which the direction is not part of the relationship's meaning (e.g., X and Y are different operating systems). The links may map the relationship between the resources at same or different levels, and relationships between resources and their metadata (e.g., configuration, runtime). This beneficially allows users to discover relationships and explore how the resources and/or metadata are connected. For example, users may query information about how the data is connected to the service such as which database it is running on, discover how services relate to other services or which clusters they belong to.

The graph may be created by the system to map resource relationships (e.g., relationship mapping of APIs and resources). The multi-dimensional relational graph may be updated in real-time to reflect the latest available information. For example, when a new resource is added or created, relationships of the new resource with respect to other resources may be automatically established. The DDQL reflects these relationships and makes all resources accessible to users.

The multi-dimensional relational graph may provide multidimensional views on the resources, metadata and how the resources and metadata relate. In some embodiments, the multidimensional view may include directional links and may reflect the multi-perspective approach with nodes and layers as described herein. In some cases, this approach may allow the user to query information regarding one node and obtain associated information from multiple connected resources. In some instances, the associated information may be about nodes that the queried nodes may be connected to, such as other connected resources and metadata. In some examples, the associated information may be defined relationships to other nodes or between nodes.

Figure 4:
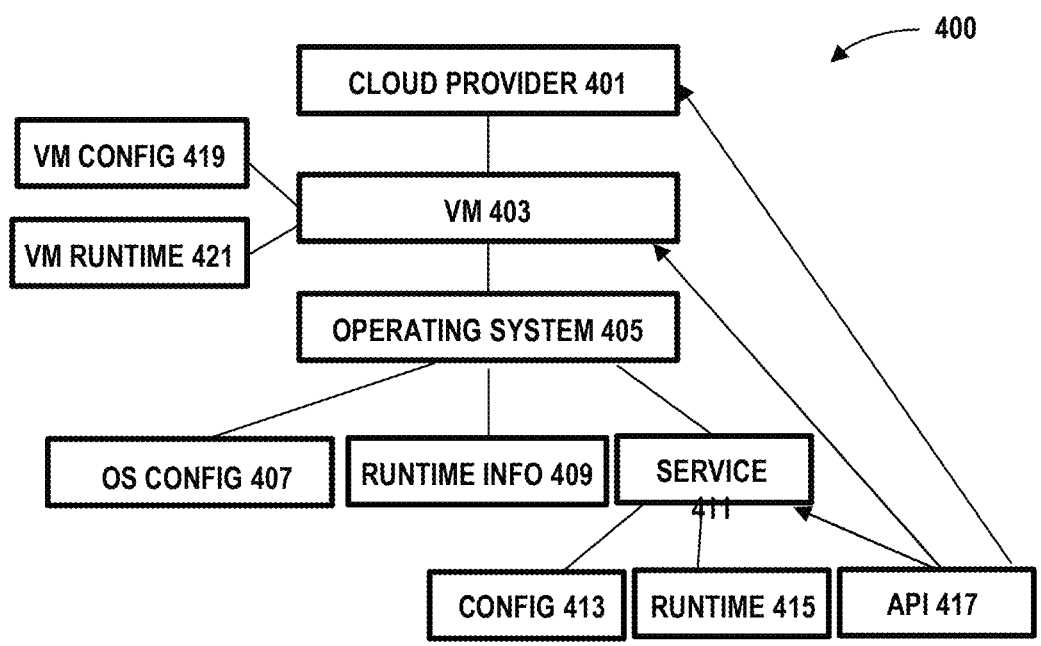
FIG. 4 illustrates examples of relationships established by the DDQL, in accordance with embodiments of the invention.

FIG. 4 shows an example of a multi-dimensional relational graph 400. As described above, the system may allow users to query information about resources and their metadata, discover relationships and query about how the resources are connected. For example, a user may query information regarding how the cloud provider 401 is connected to the VM 403, how the VM 403 is connected to the operating system 405, which services 411 the API 417 may belong to, which VM 403 the API 417 is running on and which cloud provider 401 the API 417 is hosted on. In some examples, the user may query information regarding how data may be connected to the service 411, such as what database it is running on. Upon receiving a query from a user, the system (e.g., search engine) may traverse the graph automatically to determine the relationships (e.g., direct, indirect relation, type of relation, etc.) and/or the connected resources to collect the relevant data. For example, the search engine may return that the API 417 belongs to service 411, API 417 runs on VM 403, the API is hosted in cloud 401, API runs on database, or the API connects to other APIs.

Multi-Layered Resource Stacks

In another aspect of the present disclosure, instead of or in addition to the graph data structure, a multi-layered resource stack data structure may be created for the infrastructure and mapping resource relationships. The multi-layered resource stack may provide a more intuitive and simplified representation of resources and the relationships. Additionally, the multi-layered resource stack data structure may beneficially allow for a more efficient traversing algorithm.

Figure 5:
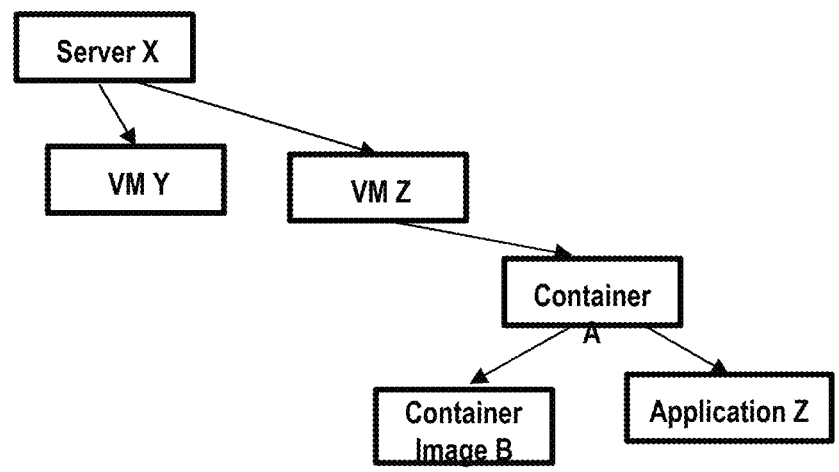
FIG. 5 shows an example of querying relationships about resources by traversing a graph of relationship.

In some cases, the multi-relational graph as described above can be complex that is hard to reason and comprehend by a user. For example, a query may traverse a graph having servers connected to the containers that are running on them, and containers connected to the applications inside of them. FIG. 5 shows an example of querying relationships about resources by traversing a graph of relationship. As illustrated in the graph, a container (e.g., container A) has a relationship to the container image (e.g., container image B), and the container (e.g., container A) also has a relationship to the virtual machine (e.g., virtual machine Z) it is running on. To investigate a resource in the graph requires traversing the graph of connected nodes in all the directions (e.g., up, down, left, right, diagonally, etc.) which can be complicated. This can be even harder to comprehend when complex use-cases that is very difficult to represent as a graph or when there are many resources (i.e., nodes) connected to one another with edges (e.g., relationships) traversed in various directions.

Figure 6:
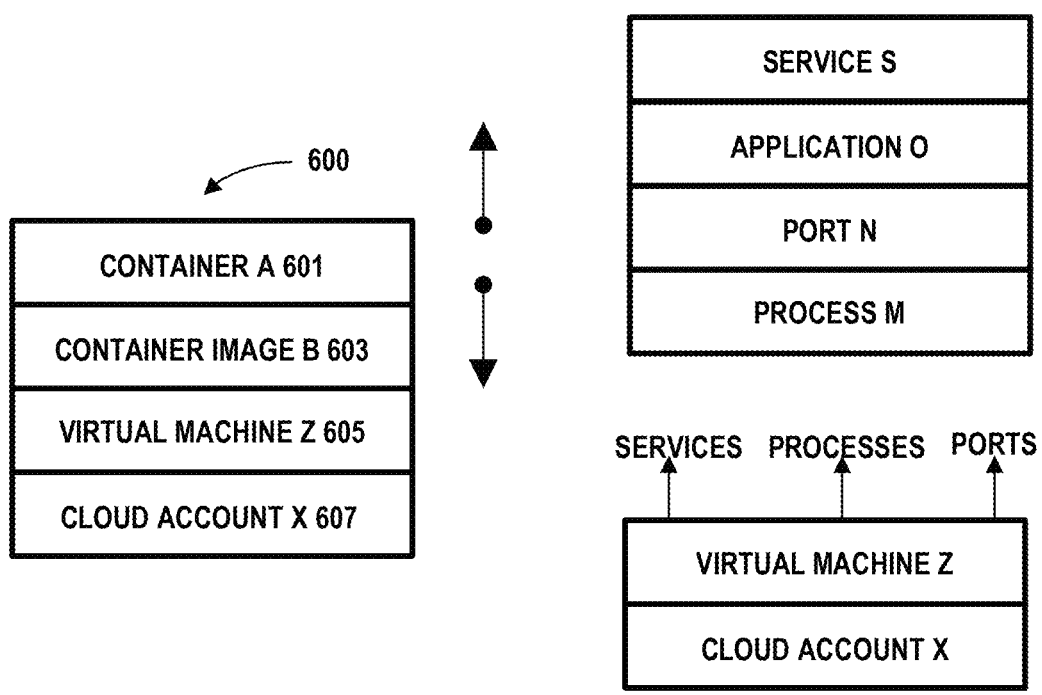
FIG. 6 shows an example of multi-layered resource stack data structure.

The distributed data query system and method may provide multi-layered resource stack data structure allow users to discover how resources may be related (e.g., how services are related to other services or which clusters they may belong to) in a more intuitive and simplified fashion. FIG. 6 shows an example of multi-layered resource stack data structure 600. The illustrated multi-layered resource stack is created for a resource e.g., container A. the resource stack 600 may comprise a plurality of layers representing a build of materials or resources that are related to a resource. For example, the multi-layered resource stack 600 for the resource, e.g., container A, may comprise one or more underlying layers such as container image B layer 603, virtual machine Z layer 605, AWS-account X layer 607, that are related to the layer 601 corresponding to container A. The one or more underlying layers may represent components or resources related to the resource being investigated, i.e., container A (e.g., container images that container A was created from, the machine container A is running on, and the cloud account container A is a part of).

The multi-layered resource stack data structure may allow for an efficient traversing or querying. For example, the multiple layers may be traversed in only two directions i.e., up and down. These layers may be traversed in either direction to get more details on related resources.

In some cases, each layer of the multi-layered resource stack may have one or more resources. For example, a container layer may have one or more containers as resources and an application layer may have one or more applications as resources. Alternatively, a layer may not contain any resource, in which case the layer may be omitted (not presented.

The multi-layered resource stack may beneficially provide a simplify representation of the resources. In some cases, a resource stack may be built around a singular resource. For example, a container layer may contain only a single container XYZ and the underlying layer may contain only the node that the container XYZ is running on in the runtime layer. In some cases, a resource stack may be simplified by building around a group of related resources that can be represented in a single layer. For example, a container layer may contain multiple or all the containers in an environment the underlying layer may contain only all the runtimes for all the containers running on.

Additionally, the multi-layered resource stack may provide a simplified representation of the underlying real relationships by allowing multiple layers to be nested into one layer and/or expanded when desired. In an example, when an application is investigated, the layer for databases in the resource stack may be simplified as a postgres database that the application is connected to. The simplified database layer may correspond to a simplification of the actual databases including a database cluster consisting of multiple database services running on different virtual machines to be highly available with storage layers attached to them. Information of such actual database cluster may be expanded in the resource stack view if a user desires to view such information. Alternatively, such database cluster may be simplified as one database layer when looking at it from the application's perspective (e.g., investigation an application and see what resources are connected to it).

Figure 7:
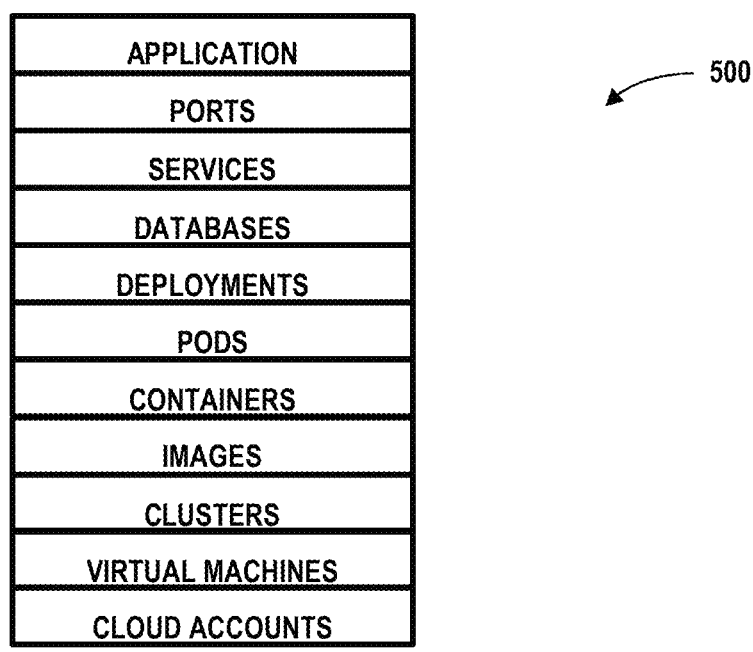
FIG. 7 shows an example of resource stack created for an application.

The resource stack data structure may be created for a resource by looking at all the resources or components it is built on and/or resources it is connected to. For instance, the resource stack data structure may provide an Application Build of Materials. FIG. 7 shows an example of resource stack created for an application 700. As shown in the example, the resource stack for the application may be created by looking at all the components that it is built on (e.g., ports, services, databases, deployments, pods, images, containers, Kubernetes cluster, virtual machines and cloud accounts, etc.). The resource stack provides flexibility to store all the information related to the resource such as cloud account.

In some cases, the resource stack may be automatically converted from a graph. For instance, nodes in a graph may be categorized to form one or more layers. For example, a plurality of nodes representing virtual machine X, virtual machine Y, and virtual machine Z may be categorized as virtual machine and formed the virtual machine layer. Next, the formed layers may be arranged into stacks. The stack may have a simple traversal direction (e.g., up and down).

In some cases, the conversion between he graph and resource stack is bidirectional. For instance, a graph may be automatically converted into a resource stack, and a resource stack may be automatically converted into a graph. In some cases, the resource graph may be automatically converted from a resource stack. For instance, nodes in a resource stack may be converted into a graph representation. For example, a virtual machine layer may be converted to the graph representation of its contained virtual machine X, virtual machine Y, and virtual machine Z and their connection to other assets.

In some cases, a user may select one or more layers from a stack of plurality of layers to convert into a resource graph. This beneficially allows individual assets in one or more layers of a resource stack to be selected for further investigation. The capability of mixing and combining use of resource stack and resource graph provides flexibility for users to select a subset of assets and investigate individual assets in one or more layers of the resource stack in a desirable format (i.e., graph representation).

Compared to a graph or the real infrastructure, the resource stack may provide a visual representation that is easier for a user to understand by simplifying the layer (e.g., through aggregation), simple traversal and rearrangeable order of layers (e.g., users can rearrange the layers to reflect a relationship among resources that make sense to them).

In some embodiments, the system may allow users to group selected layers together. For example, a user may select multiple related layers and group them into one combined layer. This may reduce the number of layers presented to users and simplify the asset stack. Grouped layers may aggregate information from each individual layer and present the aggregated information to users. Grouped layers may contain regular and grouped layers. In some cases, a user may be permitted to traverse grouped layers. For example, a user may select a grouped layer to look at individual layers contained in the grouped layer.

In some embodiments, the system may allow users to enable or disable selected layers. For example, a user may select a layer and enable a layer that makes sense to them. In some cases, a user may disable a layer that is less important such that when a resource is investigated, the disabled layer may not be presented to the user.

In some cases, the system may allow users to set the order or modify the order of the layers in a resource stack. The system may provide a user interface for a user to rearrange the layers in any suitable manner. For example, a user may drag a layer on top or below another one to arrange or rearrange the layers. In another example a user may set the order of layer in the stack by inputting an order number. In some cases, the system may generate a default order. The default order may be based on common deployments in clouds and in container orchestration system (e.g., Kubernetes). A user may rearrange the layers to modify the default order. For example, a user may move up a layer (higher order) to focus on the layer that is otherwise further down in the resource stack.

Referring back to FIG. 6, the provided resource stack data structure allows for a simplified traversal algorithm with improved efficiency. As shown in the example, a resource stack can be traversed in both directions. In some embodiments, the traversing algorithms may use an iterative approach. The algorithm may take the manual and inefficient route (enumerate relationships step by step on every query) initially. Next, the algorithm may optimize the route by introducing caching around each individual layers to make the enumeration more efficient. For example, the algorithm may cache what VMs are connected to a deployment in k8s for a container layer. Subsequently, the algorithm may use the cached layers to traverse more quickly (e.g., is a VM part of a k8s deployment? If so, traverse to the deployment to see all VMs of it). Such data structure and the algorithm may optimize around layers that have more connected assets/resources. For example, the resource stack may have the broad distribution of assets around container layer and a smaller distribution around the cloud accounts layer.

The system may provide a visualization tool allowing a user to view the data in a resource stack. For example, data in a resource data may be visualized or accessed directly via the underlying data structures such as by retrieving the resource stack via an API.

Figure 8:
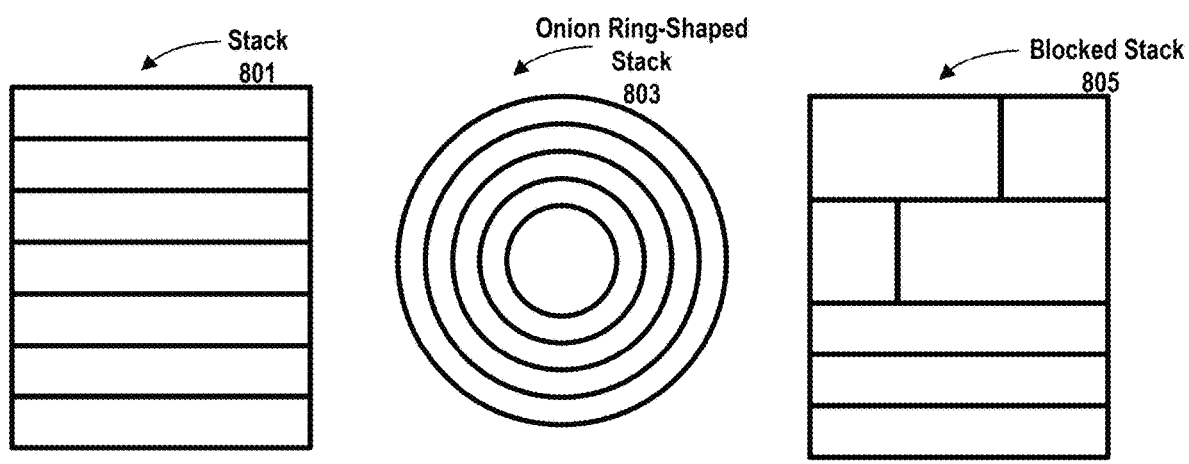
FIG. 8 shows various visual presentations of a resource stack.

The system may provide various different visual presentations of the resource stacks. FIG. 8 shows various visual presentations 801, 803, 805 of a resource stack. For example, a resource stack 801 may also be presented in various other shapes, arrangements such as onion shape 803. In some cases, one or more layers may be merged into and presented as blocks 805.

The query result may include multi-dimensional views on resources and their metadata. The query result may be visually displayed to the user. The query result may comprise the search result, a graph showing the queried object and the related object (e.g., configuration, state, API, connected resources), and/or description about the object (e.g., resource's metadata). In some cases, a resource stack may be displayed to users along with description and/or metadata of resources.

The DDQL may be used to traverse both the graph and the resource stack as described above. The DDQL herein may allow users to query these resources and metadata and their relationships to other resources using unstructured text queries such as: "is X running on Y", "is X part of Y", "is X connected to Y", "is X indirectly connected to Y," or negative checks such as "is X not connected to Y", "is X not part of cluster Y" etc. This beneficially allows users to inspect the objects and explore its relationships without knowledge about the availability of the resources, hierarchies of the data or the relationships.

In some embodiments, the search engine may process the unstructured query into words and parts of speech, create one or more structured/executable queries such as graph queries comprising graph identifiers and a graph query pattern, and run the structured graph queries on the graph to return the nodes, links and/or metadata as search results. The identifiers may point to a particular node, a node type, an attribute for identifying nodes, indicate a particular link, a link type, or an attribute for identifying links. In some cases, the structured query may include the DDQL building blocks as described above, database query patterns, such as directions to traverse the database, starting nodes, terminal data to be returned, Boolean logic operators, fuzzy logic operators, and methods to combine results. For example, the search engine may traverse the graph, following a path from each identified node along the identified links to reach a terminal node of the type to be returned as search results. Relevant data of each terminal node may be retrieved and aggregated, such as aggregated by the type of nodes connected.

The provided DDQL may be used to model relationships. The objects (e.g., resources, metadata) and relationship may be modeled using DDQL as described herein. As shown in the below example, the DDQL may model relationships, such as whether the file exists, where it exists, the file contents, the file permissions, and various others. The DDQL may establish relationships including the file's metadata. In some cases, these relationships allow variables to be asserted for the purpose of filtering and extracting data based on the user query. Below shows an example of using DDQL to model relationships:

```
sshd.config {
init(path string)
//File of this SSH server configuration
file( ) file <=this defines a relationship
    to the underlying file
//Raw content of this SSH server config
content(file) string
//Configuration values of this SSH server
params(content) map[string]string
//Ciphers configured for this SSH server
ciphers (params)[ ]string
. . .
}
//File on the system
file {
init(path string)
//Indicator if this file exists on the system
exists( ) bool
//Location of the file on the system
path string
//Filename without path prefix of this file
basename(path) string
//Path to the folder containing this file
dirname(path) string
//Contents of this file
content (path, exists) string
//Permissions for this file
permissions( ) file.permissions
//Size of this file on disk
size( ) int
//Ownership information about the user
user( ) user
//Ownership information about the group
group( ) group
}
```

Another aspect of the present disclosure provides a multi-perspective resource analysis system and/or platform. There may be multiple ways to examine a resource. For example, a virtual machine may be reached directly via SSH (log into the OS and examine it), may be examined via its exposed surface (e.g. open API endpoints), or inspected through a management system (e.g. AWS, VMware). The multi-perspective resource analysis system may allow for any resource to be examined through multiple transports/accesses and may collect information from all supported sources (e.g., sources connected to the to-be-examined resource) dynamically. The perspective resource analysis system may dynamically aggregate such information from the one or more connected resources to construct a view of the resource that is queried or to be examined. The view may also include all its configuration and other types of metadata, which represents a realistic depiction of the actual state of the resource.

The multi-perspective resource analysis system may also automatically provide information about objects associated with a queried object. For example, the multi-perspective resource analysis system may auto-complete a search result by providing states, configuration, connected resources that are associated with a queried resource based on the graph. For instance, the perspective resource analysis system may return information not only directly inquired by a user, but may also return information related to it, e.g., configuration, metadata, states, and the like. For example, a user may query information on a resource's location in a network and the perspective resource analysis system may automatically provide the user with its metadata. In some cases, a user may query information within a security protocol on an operating system (e.g., ports that may or may not be running) and the perspective resource analysis system may additionally provide information regarding security concerns (e.g., exposed ports) within the security protocol.

The multi-perspective resource analysis system or method can be employed by any other platform or be applied in any suitable applications. For example, a unified platform may employ the provided DDQL and multi-perspective resource analysis system for providing infrastructure and security analytics for cloud-native applications (e.g., approach involving an analysis of data that may be used for security measures, monitoring network traffic that may be used to identify indicators of compromise prior to the occurrence of a threat).

Figure 9:
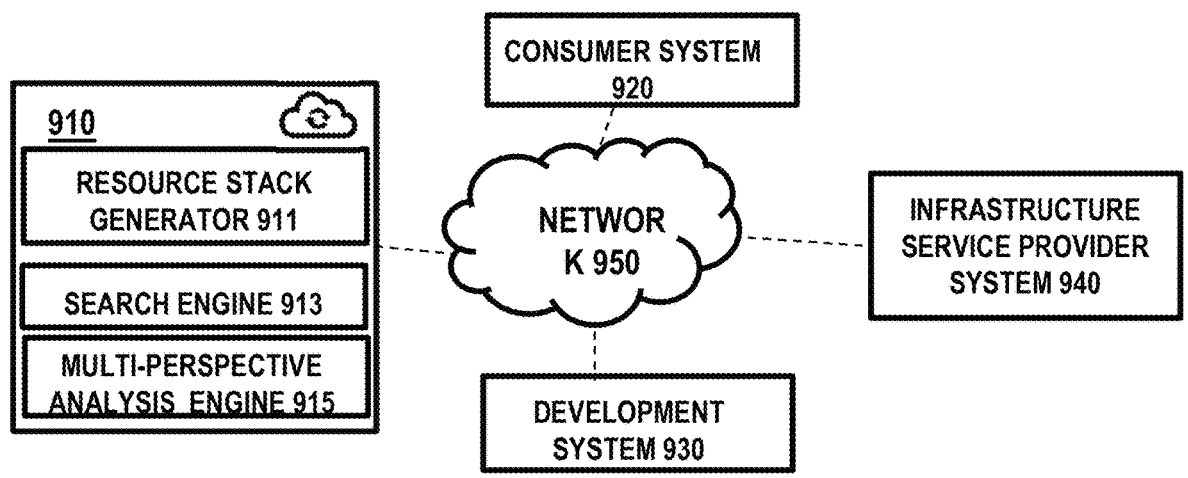
FIG. 9 schematically illustrates a system implemented for providing multi-perspective resource analysis.

FIG. 9 schematically illustrates a system 910 implemented for providing multi-perspective resource analysis. The system 910 may allow users to search, examine, and make assertions to the resources that may require information from multiple transports and/or resources. Users may interact with these resources in a holistic manner. For instance, the system 910 may auto-complete a search result by providing states, configuration, connected resources that are associated with a queried resource based on the graph or the resource stack. For instance, the perspective resource analysis system may return information not only directly inquired by a user, but may also return information related to it, e.g., configuration, metadata, states, and the like. For example, a user may query information on a resource's location in a network and the perspective resource analysis system may automatically provide the user with its metadata. In some cases, a user may query information within a security protocol on an operating system (e.g., ports that may or may not be running) and the perspective resource analysis system may additionally provide information regarding security concerns (e.g., exposed ports) within the security protocol.

In some embodiments, the system 910 may comprise multiple components including a resource stack generator 911, a search engine 913, and a multi-perspective analysis engine 915 that are communicated with one another. The search engine may also be referred to as a query engine which are used interchangeably throughout the specification.

The resource stack generator 911 may be configured to generate and manage resource stacks. For example, the resource stack generator 911 may create multi-layered resource stack to map resource relationships (e.g., relationship mapping of APIs and resources) as described above. For instance, the resource stack may be generated by automatically converted from a graph with categorization and aggregation of nodes for form layers and arranging the layers so there is simple traversal direction in the stack. The resource stack generator 911 may monitor the resources and update the multi-layered resource stack in real-time to reflect the latest available information. For example, when a new resource is added or created, relationships of the new resource with respect to other resources may be automatically established. In some cases, the resource stack generator 911 may be in communication with a graph generator. The graph generator may create graphs as described above and may update the graph based on a user input. In some cases, the resource stack generator 911 or the graph generator may update the resource stack or graph automatically upon detection of a change in the infrastructure. In some instances, the graph generated may include resources' metadata and the metadata may also be updated to reflect the user query.

The search engine 913 may receive a query and traverse the resource stack to determine which data to collect. The traversal has improved efficiency by the simple traversal direction and employing the iterative approach as described above. For example, a user may query a resource or attribute of an object (e.g., a resource) without knowing ahead of time the available relationship or hierarchies of the objects. The user may submit a query about resources as if they contained all information from all layers at once. The query engine may be in communication with the resource stack generator to access the latest available information.

The search engine may collect the relevant data on-the-fly that does not require an existing database that has relevant data (e.g., raw data) ready for the query. As described above, the search engine may use the distributed data query language (DDQL) and traverse the resource stack to determine which data to collect based on the user input query. The system 910 may not require data to be stored in a passive data store. The system 910 (e.g., server) may comprise a cache to speed up requests that the system has answered in the recent past.

The capability of collecting the relevant data in an ad hoc manner may reduce the requirement for the system to know which data will be queried beforehand. The system 910 may identify the resources to fetch data and collect the data on the fly based on the types of resources and their metadata in the resource stack. The system 910 may determine what data to be collected, pre-processed and stored in the cache based on the user query.

For example, a user may set a new query in the system (e.g., via the UI) about "show all packages installed on Windows in EC2." The search engine may compile the query and convert it into executable query code by traversing the resource stack. The executable query code may include the resources from which data to be collected. In the above example, the user query may be converted into three parts: "(1) need all machines in EC2, (2) need only the window machines from this list and (3) need the packages installed on those machines."

Next, the search engine may look up any data that has been cached in the server already to answer at least part of the executable query code e.g., (1) get the list of machines running in EC2. If this information has been collected already, the search engine may look it up from the cache. In some cases, for the missing data (e.g., data requested in (2) and (3) of the executable query code), the search engine may send the relevant executable query code (e.g., (2) and (3) of the executable query code) to the agents that are close to the requested resources in the resource stack. The requested resources may be identified by traversing the resource stack based on the user input query. In this example, the search engine may obtain the platform information and the list of packages by collecting such data from all the machines searched in part (1), the EC2 machine list.

Next, the agents may execute the executable query code to get data results. The data results may be pre-processed. For example, the agents may execute part (2) of the query code to get the information about the platform of the machine in order to filter out machines that are not Windows. The search engine may then run part (3) on the remaining machines, to get a list of packages that are installed. The agents may then send the information back (e.g. "I'm a Windows machine and here are all my packages" or "I'm not a windows machine") to the system. The system 910 (e.g., server) may cache this information and aggregate all results for the end-user.

In some cases, the agents may keep track of any real-time changes regarding the queried resources. For example, after executing the query, the agents may keep tracking any changes to the machine's platform and list of packages.

Upon detection of a change, the agents may send updates to the system 910 (e.g., server). An agent may be implemented in software, hardware or a combination of both.

In some cases, the search engine may receive the query through a user interface. For example, a user may input a query through a command line tool (e.g., an interactive command-line interface (CLI)). A user may begin exploration of resources in any suitable ways. For instance, a user may type "help" to receive an introduction.

In some cases, when a user types a query, the search engine or user interface (e.g., CLI) may auto-complete the query with the known resources and/or their metadata fields, or complete the query with resources that are available to the current system. For example, the CLI may auto-complete a query by displaying the query context along with resources that actually work/available on Linux. For instance, as a user typing "ssh" in the CLI may display suggestions such as "sshd.config." Such "config" may be automatically retrieved for the "ssh" resource based on the relationship and connected resources in the resource stack data model. In some cases, all the available associated objects (e.g., configuration, state, runtime, etc.) may be automatically identified by the search engine based on the resource stack and the input user query (e.g., querying about an object). The user may choose to further explore the resources based on the auto-completed data. In another example, as a user continues to type "pa" and the query may auto-complete it as "params". In some cases, the user interface may display explanations such as information about the meaning of words (e.g., "params") in the command-line.

In some cases, the user may initiate a search via a user interface (UI) (e.g., graphical user interface (GUI)). The UI may receive user input such as via a search bar. In some cases, the search bar may function similarly to the CLI such as to auto-complete a query or automatically provide associated, available resources based on a user input. For example, the user may connect to a VM via the UI to search the resources. The system may allow users to connect to multiple virtual machines (e.g., thousands or millions) at the same time, and query about the resources related to the virtual machines. The search engine may automatically aggregate and cluster the information queried.

In some cases, the user input may not be a query. For instance, the user interface may receive user input including assertions for a policy. For example, a user may want to ensure that they do not run an old version of SSL/TSL. The user may write "ports.where (ssl.enabled).all (ssl.protocol=='tls1.3')" in their policy via the user interface, which may be executed as assertions.

The multi-perspective analysis engine 615 may allow resources to be examined through multiple transports. In some cases, the multi-perspective analysis engine 615 may collect information regarding resources and their metadata from all supported sources. Examples of supported sources and transports may include, but are not limited to, OS-level access (e.g., Linux shells like bash or zsh, Windows PowerShell, OSX shells like bash), remote OS-level access (e.g., via SSH or WinRM), remote API-level analysis (e.g., testing exposed OSI Layer 3 information like IP or ICMP, OSI Layer 4 information through exposed TCP/UDP ports, higher OSI layers via interactions with the protocol like SSL/TLS, or database APIs including Mysql, Postgres, Oracle SQL), and management-system analysis (e.g., AWS, Azure, GCP, VMware, Docker/Moby, Kubernetes).

The multi-perspective analysis engine 615 may aggregate and cluster such information to construct a view of the queried resources. The multi-perspective analysis engine 615 creates and updates the view in real-time to reflect the latest available information. For example, the multi-perspective analysis engine 615 may dynamically construct a view in response to a query by retrieving the relevant data from multiple transports/resources based on the multi-dimensional relational graph. In some instances, this view may include some or all the resource's configurations and metadata. The view may represent a realistic depiction of the state of the resources involved in the user query.

For example, a user may want to know all ports that are not running "TLS1.3" on a network. With the conventional system and methods, the user may connect to their network and scan remotely (e.g., they are not logged onto a machine). The user may type a query via a UI and obtain results which indicate one of the ports (e.g., port 12345) is exposed. In order to further explore the port and associated information (e.g., what process may be running on it), the user may have to type the relevant query (e.g., "port(12345).process") through a remote scan. This requires the user to know ahead of time the relationship between "port" and "process" in order to query about the "process". However, the provided multi-perspective analysis engine 615 may answer the user question (in natural language) such as "which ports are not running on TLS1.3 and what process are running on those ports" without requiring the user to know the port and process relationship. The provided multi-perspective analysis engine may also answer user queries without requiring the user to know ahead of time where to collect information or what sources are relevant in order to collect data, since some of the information can be dynamically scanned, and some of the information may be obtained from the machine.

As described above, the multi-perspective analysis engine 915 may allow users to input an unstructured text query (e.g., "which ports are not running on TLS1.3 and what process are running on those ports"), create one or more structured queries (or executable query code), and run the structured queries on the resource stack to return the associated resources and/or metadata as search results.

In some embodiments, the system 910 may perform DDQL real-time parallel execution and monitoring thereby providing improved performance. Traditionally programs may be executed serially (e.g., as i.e. top to bottom), which can be slow. The DDQL herein may be capable of providing faster execution times through parallel execution. For example:

sshd.config {
params
   file.path
}

A traditional program, which may be executed serially, may execute the first line, 'sshd.config.param' before executing the second line 'file.path'. In this example, a program may either proceed to a subsequent operation once a prior operation has been completed or execute operations asynchronously (e.g., run a current operation and a subsequent operation) if defined by the user.

In the provided DDQL, the operations may be executed concurrently and the data from the operations may be collected depending on what information may be returned first. This may allow for high levels of concurrency without users having to manually define the concurrency of operations. This may also allow users to not worry about keeping operations in sync. In the example above, using DDQL, the statement 'file.path' may be completed first, as 'params' may rely on the file and its contents. In this instance, the file information may be collected after the file is retrieved.

In some embodiments, the system 910 may allow for monitoring resources and updating information, such as information on resources, metadata, user query results, with improved performance. The system may update the resources and the resource stacks upon detection of a change. In some cases, the query may be executed in watching mode. For instance, upon executing a query in watching mode, the system may collect initial results as well as keep monitoring some or all of the underlying data for changes. If changes occur, the resources and queries may be automatically updated resulting in a new search result. This may allow users to be alerted by setting up hooks to the events and take action through DDQL. The user may be permitted to set up the rules to trigger an alert (e.g., event) such that an action may be taken through the DDQL if changes are detected in a monitored resource. In some instances, users may be alerted to some or all of the changes that may have occurred in the resources or metadata that they may have been monitoring.

This monitoring capability of the system may also improve security and compliance scanning, policy scanning, vulnerability management, and CI/CD security. In conventional solutions, a policy scan may be run once to collect data or thereafter may be run after some time (e.g., weeks or months). The security/compliance scanning provided by the system/DQL may monitor the policy results for any changes, where the results may be automatically updated if changes occur to the underlying queries. This may avoid the need to re-run the entire policy scans and allows DDQL to update sections and re-computes scores that may have been affected.

The system 610 provides an integrated solution that enables application developers to achieve various functionalities as described above. The system 610 may be implemented on a cloud platform system (e.g., including a server) that is in communication with one or more consumer systems 620, development system 630 and infrastructure service provider system 640 via a network 650.

The cloud platform system 610 may provide application developers with improved data access (e.g., transparent access to resources), accelerated development, deployment, orchestration, and management of the container applications and/or native applications in the infrastructure service provider system 640. For example, the cloud platform system 610 may provide application developers with the functionality to query resources, manage security thereby rapidly designating, building, testing, and/or deploying their container applications and/or native applications to the respective infrastructure services provider systems 640. The cloud platform system 610 may further provide security analysts information, multiple-perspective view of the resources to the application developers and enable application developers to manage security, authorization, and access control of their container applications and/or native applications. The services of the deployed container applications and/or native applications may then be accessed or used by the application developer's customers, clients, or consumers via their systems (e.g., consumer system 620).

In some embodiments, users of the system may be clients, consumers, developers, or any other end users. In some cases, consumer system 620 may include one or more devices, as described herein, capable of operatively or communicatively being connected to container and/or native applications.

The cloud platform system 910 may be configured to provide the aforementioned functionalities to the users (e.g., application developers) via one or more command line interfaces (CLIs) and/or graphical user interfaces (GUIs), which may include, without limitation, web-based GUIs, client-side GUIs, or any other GUI as described above. Development system 930 may include a system consisting of individuals, corporations, organizations, and any other entity that may be involved in application development. Development system 930 may include one or more development devices providing one or more CLI and/or GUI based applications configured to communicate and utilize the various functionalities provided by the cloud platform system 910. The development system 930 may further comprise of devices that may be used in the application development process. For example, development system 930 may consist of development devices, such as associated microservices. In some cases, development devices may include, but are not limited to, source code editors, compilers, linkers, debuggers, source code analyzers, source code management systems, asset repositories, and/or Integrated Development Environments (IDE).

The infrastructure service provider system 940 may represent one or more data centers of cloud computing service providers, and various infrastructure such as those described herein. For example, server devices of an infrastructure services provider system may generally include, without limitation, a native or bare-metal hypervisor (e.g., VMWARE ESXi hypervisor, MICROSOFT Hyper-V hypervisor, KVM hypervisor, Proxmox hypervisor, etc.) configured to execute and manage multiple instances of guest operating systems (e.g., MICROSOFT Windows Server, Ubuntu Server, Debian Linux, CentOS Linux, Red Hat Linux, Ubuntu Snappy, CoreOS, VMWARE Photon, etc.) on the server device, guest operating systems which may be generally configured to execute one or more container engines (e.g., Docker Container Engine, rkt Container Engine, etc.) and one or more native applications. In some embodiments, cloud computing service providers may use various combinations of protocols (e.g., HTTP, HTTPS, TCP, IP, etc.), standard formats (e.g., JavaScript Object Notation (JSON), Extensible Markup Language (XML), etc.), and APIs (e.g., Microsoft Services Management APIs, Amazon Elastic Compute Cloud APIs, Google Cloud JSON APIs, etc.). In some cases, data centers may be internal or external to the entity developing the application. In some examples, service provider system infrastructure 940 may be geographically and virtually separated and/or connected, or any variation thereof.

Consumer system 920, development system 930, and infrastructure service provider system 640 may be connected to a network 950. Network 950 may comprise one or more computer and/or telecommunications networks. In some embodiments, network 950 may include, but is not limited to, intranet, extranet, Internet, and local, regional, global telecommunications networks, etc. In some cases, network 950 may include wired and/or wireless connections. In some instances, devices may receive and/or transmit information as electrical and/or optical signals, such as Ethernet or Fiber Channels. In some instances, devices may receive and/or transmit information as radio signals in frequencies according to one or more wireless communication standards, such as Wireless IEEE 802.11, WiMAX IEEE 802.16, Global Systems for Mobile Communications (GSM), Enhanced Data Rates for GSM Evolution (EDGE), Long Term Evolution (LTE), Bluetooth standards, or Near Field Communications (NFC) standards.

It should be noted that although the data query methods as described herein are presented in the context of infrastructure and security analytics, the methods and systems as described herein can be used to provide data query to any existing platform or systems.

In some embodiments, one or more systems or components of the present disclosure are implemented as a containerized application (e.g., application container or service containers). The application container provides tooling for applications and batch processing, such as web servers with Python or Ruby, JVMs, or even Hadoop or HPC tooling. Application containers are what developers are trying to move into production or onto a cluster to meet the needs of the business. Methods and systems of the invention will be described with reference to embodiments where container-based virtualization (containers) is used. The methods and systems can be implemented in applications provided by any type of systems (e.g., containerized application, unikernel adapted application, operating-system-level virtualization or machine level virtualization).

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will also recognize that select televisions, video players, and digital music players with optional computer network connectivity are suitable for use in the system described herein. Suitable tablet computers, in various embodiments, include those with booklet, slate, and convertible configurations, known to those of skill in the art.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. In some cases, cloud computing is provided by a cloud computing service provider, which may include, by way of non-limiting examples, Microsoft Azure, Amazon Web Services, Google Compute Engine, and Alibaba Cloud. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or extensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB.NET, or combinations thereof. Compilation is often performed, at least in part, to create an executable program. In some embodiments, a computer program includes one or more executable complied applications.

Web Browser Plug-In

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB.NET, or combinations thereof.

Web browsers (also called Internet browsers) are software applications, designed for use with network-connected computing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile computing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of digital media, advertising, and game information. In various embodiments, suitable databases include, by way of non-limiting examples, relational databases, non-relational databases, object-oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In a particular embodiment, a database is a distributed database. In other embodiments, a database is based on one or more local computer storage devices.

What is claimed is:

1. A computer-implemented method for querying infrastructure information, the method comprising:
    (a) receiving an input query from a user to examine an object in an infrastructure comprising one or more physical or virtual resources;
    (b) upon receiving the input query, executing a traversing algorithm to traverse a relational graph structure to identify one or more resources that are connected to the object for collecting data, wherein the data comprises metadata of the object or a relationship between the object and the one or more identified resources, and wherein the relational graph structure is a multi-layered stack with two traversing directions thereby simplifying the traversing algorithm; and
    (c) aggregating the data collected in (b) to construct a view for the object, wherein the view comprises information about the metadata of the object or the relationship between the object and the one or more identified resources.

2. The computer-implemented method of claim 1, wherein a resource of the one or more physical or virtual resources of the infrastructure is represented as a layer in the multi-layered stack.

3. The computer-implemented method of claim 1, wherein a layer of the multi-layered stack represents a group of one or more of the physical or virtual resources in a same category.

4. The computer-implemented method of claim 1, wherein the input query is an unstructured text query.

5. The computer-implemented method of claim 4, wherein the input query is processed and converted into one or more executable query codes.

6. The computer-implemented method of claim 5, wherein the one or more executable query codes are delivered to one or more distributed agents at the one or more identified resources.

7. The computer-implemented method of claim 6, further comprising executing the one or more executable query codes to collect the data from the one or more identified resources and combining the data as a result of the input query.

8. The computer-implemented method of claim 5, wherein the one or more executable query codes are executed in parallel.

9. The computer-implemented method of claim 5, wherein the one or more executable query codes are expressed in distributed data query language which comprises at least a building block for filtering and extracting data with an assertion feature.

10. The computer-implemented method of claim 9, wherein the distributed data query language further comprises a scripting building block and data query building block.

11. The computer-implemented method of claim 1, further comprising updating the relational structure upon detection of a change in the infrastructure.

12. The computer-implemented method of claim 1, wherein the relationship between the object and the one or more identified resources are not part of the input query and wherein a knowledge of a connection between the object and the one or more physical or virtual resources is not required from the user prior to the query.

13. The computer-implemented method of claim 1, further comprising automatically completing the input query by displaying available one or more resources on a user interface.

14. The computer-implemented method of claim 1, wherein the multi-layered stack comprises one or more layers that are selectable by a user to form a combined layer.

15. The computer-implemented method of claim 1, wherein an order of one or more layers of the multi-layered stack is modifiable by a user.

16. A non-transitory computer-readable storage medium including instructions that, when executed by one or more processors, cause the one or more processors to perform operations comprising:

(a) receiving an input query from a user to examine an object in an infrastructure comprising one or more physical or virtual resources;

(b) upon receiving the input query, executing a traversing algorithm to traverse a relational graph structure to identify one or more resources that are connected to the object for collecting data, wherein the data comprises metadata or the object or a relationship between the object and the one or more identified resources and wherein the relational graph structure is a multi-layered stack with two traversing directions thereby simplifying the traversing algorithm; and (c) aggregating the data collected in (b) to construct a view for the object, wherein the view comprises information about the metadata of the object or the relationship between the object and the one or more identified resources.

17. The non-transitory computer-readable storage medium of claim 16, wherein a resource of the one or more physical or virtual resources of the infrastructure is represented as a layer in the multi-layered stack.

18. The non-transitory computer-readable storage medium of claim 16, wherein a layer of the multi-layered stack represents a group of one or more of the physical or virtual resources in a same category.

19. The non-transitory computer-readable storage medium of claim 16, wherein the multi-layered stack comprises one or more layers that are selectable by a user to form a combined layer.

20. The non-transitory computer-readable storage medium of claim 16, wherein an order of one or more layers of the multi-layered stack is modifiable by a user.

* * * * *